(12) United States Patent
Meyer et al.

(10) Patent No.: US 11,105,119 B2
(45) Date of Patent: Aug. 31, 2021

(54) LOCKING DEVICE FOR A VEHICLE SEAT

(71) Applicant: Ford Global Technologies, LLC, Dearborn, MI (US)

(72) Inventors: Sebastian Meyer, Monheim am Rhein (DE); Majid Arefi, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 642 days.

(21) Appl. No.: 16/019,809

(22) Filed: Jun. 27, 2018

(65) Prior Publication Data
US 2019/0048617 A1    Feb. 14, 2019

(30) Foreign Application Priority Data
Aug. 14, 2017   (DE) .......................... 102017214149.2

(51) Int. Cl.
| | | |
|---|---|---|
| *E05B 15/04* | (2006.01) | |
| *B60N 2/22* | (2006.01) | |
| *E05B 85/26* | (2014.01) | |
| *B60N 2/20* | (2006.01) | |
| *B60N 2/015* | (2006.01) | |
| *B60N 2/36* | (2006.01) | |

(Continued)

(52) U.S. Cl.
CPC .......... *E05B 15/04* (2013.01); *B60N 2/01583* (2013.01); *B60N 2/20* (2013.01); *B60N 2/2245* (2013.01); *B60N 2/366* (2013.01); *E05B 77/38* (2013.01); *E05B 77/42* (2013.01); *E05B 85/26* (2013.01); *B60N 2/3011* (2013.01); *B60N 2205/20* (2013.01)

(58) Field of Classification Search
CPC ......... Y10T 292/1043; Y10T 292/1047; Y10T 292/1051; Y10T 292/1052; Y10S 292/61; E05B 17/0041; E05B 77/42; E05B 2015/0458; E05B 77/38
See application file for complete search history.

(56) References Cited

U.S. PATENT DOCUMENTS

| | | | | |
|---|---|---|---|---|
| 4,941,696 A | * | 7/1990 | Yamada ................... | E05B 77/38 292/216 |
| 5,064,229 A | * | 11/1991 | Hamada ................ | E05B 85/045 292/216 |

(Continued)

FOREIGN PATENT DOCUMENTS

| | | | | |
|---|---|---|---|---|
| DE | 10215691 A1 | * | 1/2003 | ............. E05B 85/26 |
| DE | 102006019347 A1 | * | 11/2006 | ............. E05B 77/38 |

(Continued)

*Primary Examiner* — Kristina R Fulton
*Assistant Examiner* — Noah Horowitz
(74) *Attorney, Agent, or Firm* — David Coppiellie; Price Heneveld LLP

(57) ABSTRACT

A locking device for a vehicle seat is disclosed. The locking device comprises at least one tolerance compensating element and a second damping element provided for damping the movement of a bolt element received in the locking device. The elements are spaced apart from one another in the direction of the action of force effected by the bolt element, such that under normal conditions the tolerance compensating element acts in a damping manner and the second damping element additionally provides a damping action under the action of high dynamic force.

16 Claims, 3 Drawing Sheets

(51) Int. Cl.
*E05B 77/38* (2014.01)
*E05B 77/42* (2014.01)
*B60N 2/30* (2006.01)

(56) References Cited

U.S. PATENT DOCUMENTS 8,297,667 B2   10/2012   Pauken et al.
9,073,457 B2    7/2015   Muller et al.

FOREIGN PATENT DOCUMENTS

| DE | 102006030732 A1 * | 1/2008 | ............... E05C 3/24 |
|----|---------------------|---------|---------------------------|
| DE | 102013216721 A1 | 2/2015 | |
| EP | 2251509 A2 * | 11/2010 | ............. E05B 83/16 |
| EP | 3238982 A1 * | 11/2017 | ............... B60N 2/20 |
| GB | 2305209 B | 4/1997 | |
| GB | 2431961 A | 5/2007 | |
| KR | 20070040483 A | 4/2007 | |

\* cited by examiner

LOCKING DEVICE FOR A VEHICLE SEAT

FIELD OF THE INVENTION

The present invention generally relates to vehicle seats, and more particularly relates to a locking device for a vehicle seat having at least two damping elements.

BACKGROUND OF THE INVENTION

In vehicles, locking devices are often used for locking equipment, such as for locking vehicle seats in position. For example, locking devices may lock the seatback relative to the seat base or may lock the base relative to a vehicle floor. Typical locking devices frequently have a pivotable rotary latch for positively receiving a bolt element, a locking element and a driver element such as is disclosed in DE 102013216721 A1 and GB 2305209 B, the disclosures of which are hereby incorporated herein by reference. In locking devices, a specific level of clearance is usually provided for a bolt element received in a rotary latch or engaged in any other type of lock. The clearance enables the locking of the bolt element to function correctly by taking into account all of the tolerance ranges of the parts of the locking device. In order to retain the bolt element in a specific position after engagement in the locking device, many locking devices have, for example, a resilient rubber damper or a leaf spring. If the bolt element engages or snaps into the device, the bolt element strikes the damper or the spring. In this example, the mobility of the bolt element is generally limited particularly in the direction of the action of force.

The force acting on the bolt element by the damper or spring generally has to be counteracted when unlocking the device. In the interests of the respective user, this should not require too great an expenditure of force. On the other hand, in the case of sharp movements of the vehicle, for example when driving on poor road surfaces, dynamic forces act on the locking device, wherein the bolt element may move and at the same time damage the device or at least rattle in a disruptive manner, if the action of the damper or the spring is insufficient in order to limit the movement thereof. It would be desirable, therefore, to design the action of resilient dampers acting on a bolt element such that it is possible to avoid both an inadvertent movement and an unlocking of the device without too great an expenditure of force.

SUMMARY OF THE INVENTION

According to one aspect of the present invention, a locking device for a vehicle seat is provided. The locking device for a vehicle seat includes at least one housing, and at least one lock and at least one bolt element operatively connected to the lock. The bolt element may be received in the lock by action of a force and movement thereof may be limited in a specific position by action of a first damping element comprising a tolerance compensating element, and wherein the lock comprises at least one second damping element spaced apart from the tolerance compensating element and arranged in a direction of the action of force of the bolt element downstream of the tolerance compensating element.

According to another aspect of the present invention a vehicle seat locking device is provided. The vehicle seat locking device includes a housing, a lock, a bolt element operatively connected to the lock and received in the lock by a force, a first damping element limiting movement of the bolt in a specific position and a second damping element spaced apart from the first damping element and arranged in a direction of the force downstream of the first damping element.

According to a further aspect of the present invention, a vehicle seat having a locking device is provided. The vehicle seat having a locking device includes a housing, a lock, a bolt element operatively connected to the lock and received in the lock by a force, a first damping element limiting movement of the bolt in a specific position, and a second damping element spaced apart from the first damping element and arranged in a direction of the force downstream of the first damping element.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
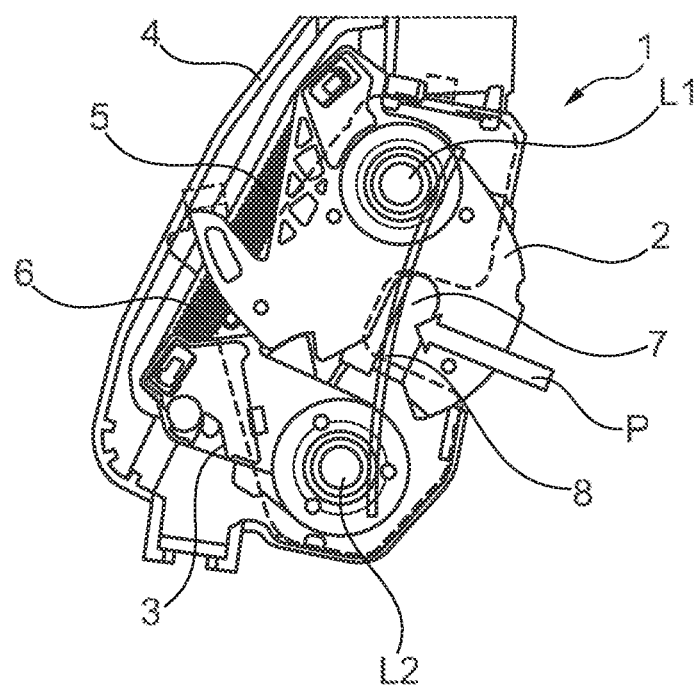
FIG. 1 is a schematic view of a conventional locking device, according to one example.

In FIG. 1 an example of a conventional locking device 1 is shown. The locking device 1 has a rotary latch 2 which is pivotably mounted about a first bearing axis L1 and a locking element 3 which holds the rotary latch 2 in a locked position and which is pivotably mounted about a second bearing axis L2. The locking element is connected to a driver component, not shown, which is also pivotably connected to the bearing axis L2. The bearing axes L1 and L2 are spaced apart from one another and arranged parallel to one another. The elements of the locking device 1 are arranged in a housing 4.

In order to restore the rotary latch 2 into the unlocked position, the rotary latch is pretensioned by a spring 5 assigned to the rotary latch 2 in the direction of the unlocked position. A further spring 6 assigned to the locking element 3 pretensions the locking element 3 in a locked position in which the locking element 3 prevents the rotary latch 2 from snapping back into the unlocked position. For releasing the bolt element, the locking element 3 is forced counter to the force of the second spring 6 into a released position, so that the rotary latch 2 snaps back into the unlocked position and releases the previously locked bolt element.

The rotary latch 2 has a bearing jaw 7 for receiving a bolt element, not shown, which is inserted in the locking device 1 and is locked in order to produce a connection in the locking device 1. The force applied by the bolt element is shown by the arrow P. In order to dampen movements of the bolt element in the locked position, a damping element in the form of a tolerance compensating element 8 is arranged in the locking device 1. The tolerance compensating element 8 shown in FIG. 1 is a leaf spring, in the form of an extended spiral spring. The leaf spring is pretensioned counter to the direction of the force implemented by the bolt element. Alternatively, the tolerance compensating element 8 may also be a different spring or a combination of a plurality of springs.

Figure 2:
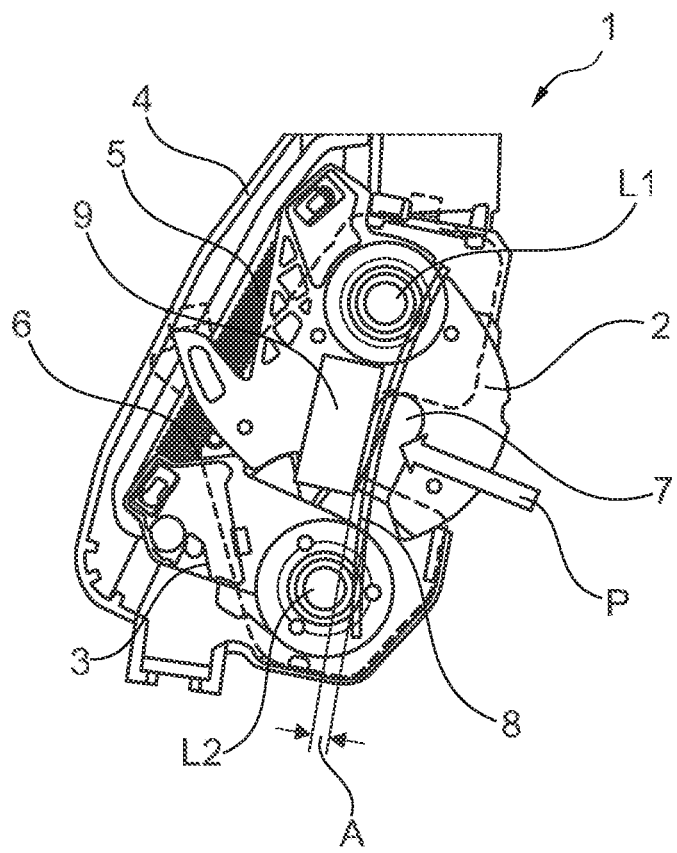
FIG. 2 is a schematic view of an embodiment of a locking device, according to one embodiment.

In the locking device 1 according to one embodiment as shown in FIG. 2, in addition to the features cited in FIG. 1, the locking device 1 comprises a second damping element 9. As such, the locking device 1 has both a first damping element 8 and a second damping element 9. In the embodiment shown, the second damping element 9 is a damper made of resilient material, i.e., an elastomer, for example made of rubber or a synthetic polymer. Alternatively, the second damping element 9 may also be a leaf spring, which corresponds to the shape of the tolerance compensating element 8 or a different spring or a combination of a plurality of springs.

The second damping element 9 is at a spacing A from the tolerance compensating element 8 which serves as the first damping element. The spacing A is dimensioned such that under normal conditions the second damping element 9 does not come into contact with the tolerance compensating element 8 but dampens and/or absorbs the movement of the bolt element if high forces act on the bolt element, for example when driving on uneven ground, such as for example unsurfaced roads, damaged roads, cobblestones, off-road or even when inserting the bolt element into the locking device 1. In these cases, the damping action of the tolerance compensating element 8 may no longer be sufficient. Undesirable interactions of the bolt element with the material of the locking device 1 in this embodiment are countered by the second damping element 9. The second damping element 9 in this embodiment dampens the movement of the bolt element when the spacing A is exceeded by the tolerance compensating element 8, the bolt element being forced thereon in the direction indicated by the arrow P.

Figure 3:
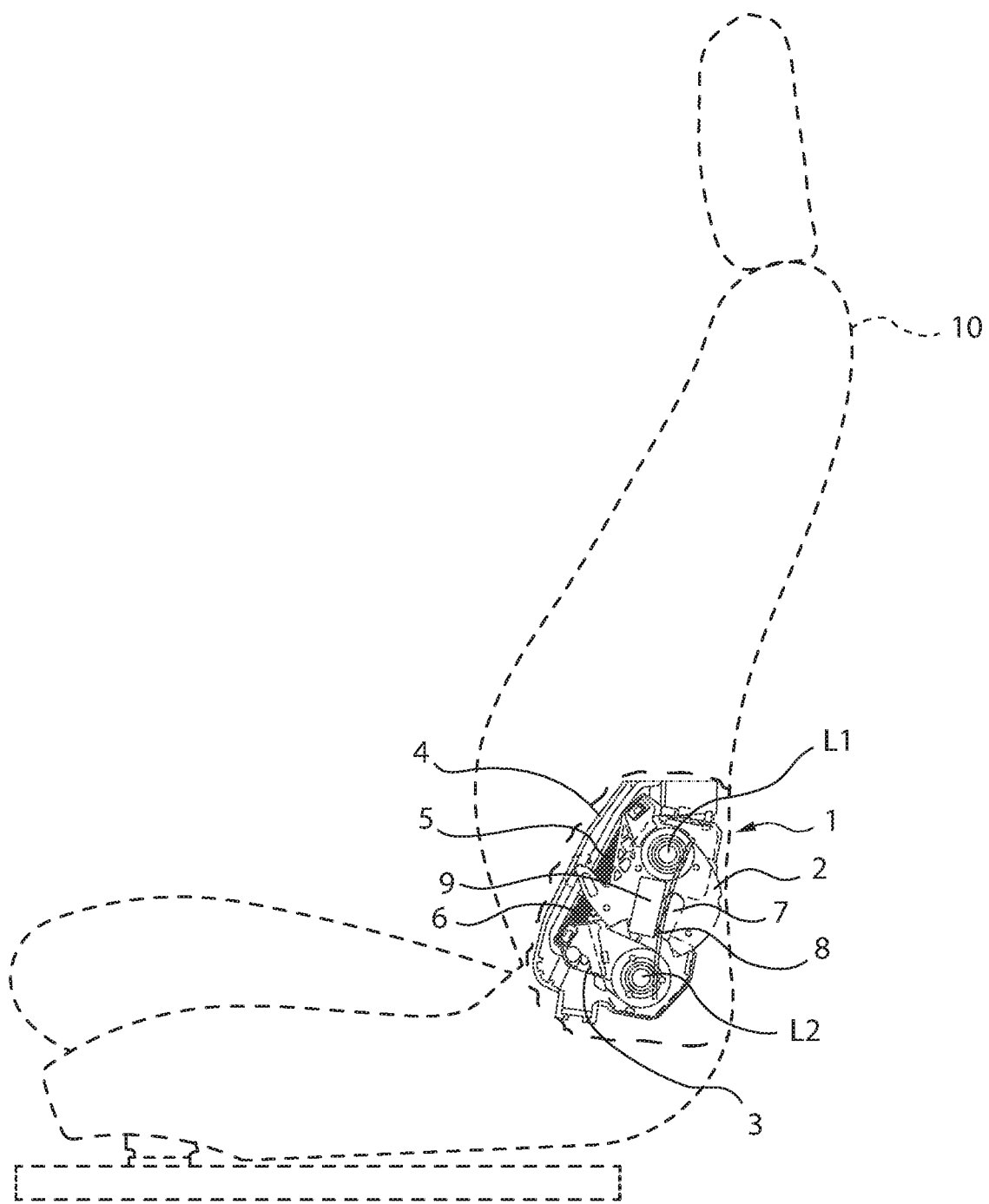
FIG. 3 is a schematic diagram of a vehicle seat employing the locking device shown in FIG. 3.

Referring to FIG. 3, a motor vehicle seat 10 is generally illustrated employing the locking device shown in FIG. 2. The motor vehicle seat 10 may employ a locking seat device 1 generally located between a seat base and a seatback to lock the seatback, according to one example. According to another example, the locking device 1 may be connected between the vehicle seat and a vehicle floor to lock the vehicle seat to the vehicle floor. It should be appreciated that the locking device 1 may be employed at various other locations on a vehicle seat, according to other embodiments.

The invention is not limited to the arrangement of a second damping element. Additionally further damping elements may also be arranged in order to secure a bolt element in the locking device 1 in a position or at least to dampen the movements thereof under the conditions of high dynamic force acting on the bolt element.

A first feature of one embodiment relates to a locking device for a vehicle seat comprising at least one housing, at least one lock and at least one bolt element operatively connected to the lock, wherein the bolt element may be received in the lock by the action of a force and the movement thereof may be limited in a specific position by the action of a tolerance compensating element, wherein the lock comprises at least one second damping element which is spaced apart from the tolerance compensating element and which is arranged in the direction of the action of force of the bolt element downstream of the tolerance compensating element.

The tolerance compensating element has the function of eliminating clearance and providing damping. Since the tolerance compensating element also has damping properties, the damping element which is arranged in the direction of the action of force of the bolt element downstream of the tolerance compensating element is denoted as the second damping element.

The locking device according to one embodiment is advantageous, since it has in addition to the tolerance compensating element at least one further element with spring or damping properties, which under high dynamic loads traps the bolt element and dampens the movements of the bolt element. In this case, the spacing, i.e., a gap, is present between the tolerance compensating element and the second damping element, so that under normal conditions the second damping element does not come into contact with the tolerance compensating element and by the action of its force it does not counteract the unlocking but dampens and/or absorbs the movement thereof if the action of the tolerance compensating element is no longer sufficient. Advantageously, in this embodiment the action of the tolerance compensating element does not have to be balanced in a complex manner between being too strong and too weak but may be selected so that it is sufficient for securing the bolt element under normal conditions.

"Lock element" is to be understood as a component of the locking device which receives and locks the bolt element by its movement in the device effected by the force exerted by the bolt element. In the opposing direction, the lock element releases the bolt element again in an unlocked position. For example, a rotary latch is known as a lock element, the rotary latch after receiving the bolt element being able to be retained in a locked position by a locking element.

The term "damping element" refers in this case to resilient devices which act in a resilient and/or damping manner. The damping element may accordingly be a spring and/or a damper. It is known to the person skilled in the art that dampers may also comprise springs but additionally, for example, rubber as the resilient material.

Preferably, in the locking device according to one embodiment, the spacing between the tolerance compensating element and the second damping element is configured such that the movement of the bolt element is additionally limited by the second damping element when a threshold value of a force acting on the bolt element is reached. As a result, advantageously a movement of the bolt element in the locking device is limited under high dynamic load. The threshold value is accordingly fixed to an anticipated dynamic load. Thus, it corresponds to a specific action of force. The actual size of the spacing is also dependent on the size of the locking device.

The tolerance compensating element may be a resilient device which cushions or dampens the movement of the bolt element and at the same time secures the bolt element in a specific position. In this embodiment the tolerance compensating element is pretensioned in the direction of the unlocked position of the lock. Preferably, the tolerance compensating element is a leaf spring in one embodiment.

The second damping element of the locking device according to one embodiment is preferably a resilient damper. In one advantageous embodiment, the resilient damper may comprise resilient material, for example rubber. The resilient material absorbs the action of force and adopts its previous shape again once the force is no longer applied.

In a further embodiment, the second resilient element is preferably a spring. Preferably, in this embodiment the second resilient element is a leaf spring. In yet a further embodiment, the tolerance compensating element and the second damping element are of the same type. The use of the same types is advantageous since the production and adjustment of the action and the strength of a spring or the resistance of a material, may be standardized.

A second feature relates to a use of the locking device according to the invention for locking a vehicle seat. A third feature relates to a motor vehicle having a locking device according to the invention.

The advantages realized in the vehicle seat and the vehicle correspond to the advantages of the locking device.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A locking device for a vehicle seat comprising:
at least one housing; and
at least one lock and at least one bolt element operatively connected to the lock, wherein the bolt element may be received in the lock by action of a force and movement thereof may be limited in a specific position by action of a first damping element comprising a tolerance compensating element, and wherein the lock comprises at least one second damping element spaced apart from the tolerance compensating element and arranged in a direction of the action of force of the bolt element downstream of the tolerance compensating element, and wherein the spacing between the tolerance compensating element and the second damping element is configured such that the movement of the bolt element is additionally limited by the second damping element when a threshold value of a force acting on the bolt element is reached, and wherein the bolt is configured to maintain contact with the tolerance compensating element when received in the lock element, and wherein the bolt element is configured to maintain a spaced relationship with the second damping element when the threshold value of a force acting on the bolt element is not reached.

2. The locking device as claimed in claim 1, wherein the tolerance compensating element comprises a leaf spring.

3. The locking device as claimed in claim 1, wherein the second damping element comprises a resilient damper.

4. The locking device as claimed in claim 1, wherein the second damping element comprises a spring.

5. The locking device as claimed in claim 4, wherein the second damping element comprises a leaf spring.

6. The locking device as claimed in claim 1, wherein the tolerance compensating element and the second damping element are of the same type.

7. A vehicle seat locking device, comprising: a housing; a lock; a bolt element operatively connected to the lock and received in the lock by a force; a first damping element limiting movement of the bolt in a specific position, wherein the first damping element further comprises a tolerance compensating element, and wherein the tolerance compensating element is configured to maintain contact with the bolt element when the bolt element is received in the lock; and a second damping element spaced apart from the first damping element and arranged in a direction of the force downstream of the first damping element, wherein the second damping element is configured to contact the bolt element when a predetermined threshold value of a force acting on the bolt element is reached, and wherein the second damping element is configured to contact the tolerance compensating element when the predetermined threshold value of a force acting on the bolt element is reached, and wherein the bolt element is configured to maintain a spaced relationship with the second damping element when the threshold value of a force acting on the bolt element is not reached.

8. The locking device as claimed in claim 7, wherein the tolerance compensating element comprises a leaf spring.

9. The locking device as claimed in claim 7, wherein the second damping element comprises a resilient damper.

10. The locking device as claimed in claim 7, wherein the second damping element comprises a spring.

11. The locking device as claimed in claim 9, wherein the second damping element comprises a leaf spring.

12. The locking device as claimed in claim 7, wherein the first damping element and the second damping element are of the same type.

13. A vehicle seat having a locking device comprising: a housing; a lock; a bolt element operatively connected to the lock and received in the lock by a force; a first damping element limiting movement of the bolt in a specific position, wherein the first damping element further comprises a tolerance compensating element, and wherein the tolerance compensating element is configured to maintain contact with the bolt element when the bolt element is received in the lock; and a second damping element spaced apart from the first damping element and arranged in a direction of the force downstream of the first damping element, wherein the second damping element is configured to contact the bolt element when a predetermined threshold value of a force acting on the bolt element is reached, and wherein the second damping element is configured to contact the tolerance compensating element when the predetermined threshold value of a force acting on the bolt element is reached, and wherein the bolt element is configured to maintain a spaced relationship with the second damping element when the threshold value of a force acting on the bolt element is not reached.

14. The locking device as claimed in claim 13, wherein the second damping element comprises a resilient damper.

15. The locking device as claimed in claim 13, wherein the second damping element comprises a spring.

16. The locking device as claimed in claim 15, wherein each of first and the second damping elements comprise a leaf spring.

* * * * *